US010393364B2

(12) United States Patent
    Chou

(10) Patent No.: US 10,393,364 B2
(45) Date of Patent: Aug. 27, 2019

(54) ILLUMINATED MOUSE PAD STRUCTURE WITH SEPARABLE CONTROL MODULE

(71) Applicant: Hades-Gaming Corporation, New Taipei (TW)

(72) Inventor: Hung-Jen Chou, New Taipei (TW)

(73) Assignee: HADES-GAMING CORPORATION, New Taipei (TW)

( * ) Notice: Subject to any disclaimer, the term of this patent is extended or adjusted under 35 U.S.C. 154(b) by 341 days.

(21) Appl. No.: 15/480,737

(22) Filed: Apr. 6, 2017

(65) Prior Publication Data

US 2018/0292081 A1    Oct. 11, 2018

(51) Int. Cl.
    *F21V 33/00*    (2006.01)
    *F21V 8/00*    (2006.01)
    *G06F 3/039*    (2013.01)
    *F21Y 115/10*    (2016.01)

(52) U.S. Cl.
    CPC ........ *F21V 33/0048* (2013.01); *G02B 6/0045* (2013.01); *G02B 6/0095* (2013.01); *G06F 3/0395* (2013.01); *F21Y 2115/10* (2016.08); *G02B 6/0021* (2013.01); *G02B 6/0083* (2013.01)

(58) Field of Classification Search
    CPC ... G02B 6/0095; G02B 6/0083; G06F 3/0395; F21V 33/0048
    See application file for complete search history.

(56) References Cited

U.S. PATENT DOCUMENTS

| 5,556,061 | A | * | 9/1996 | Dickie | G06F 3/0395 |
| | | | | | 248/118 |
| 7,175,310 | B1 | * | 2/2007 | Cotterell | G06F 3/0395 |
| | | | | | 362/253 |
| 2005/0098689 | A1 | * | 5/2005 | Sykes | G06F 3/0395 |
| | | | | | 248/118 |
| 2007/0272804 | A1 | * | 11/2007 | Tisdale | G06F 3/039 |
| | | | | | 248/51 |
| 2015/0048687 | A1 | * | 2/2015 | Wang | H01F 38/14 |
| | | | | | 307/104 |

OTHER PUBLICATIONS

Acevedo, Paul, Razer Firefly Light-up Mouse Mat review; Windows Central, Oct. 4, 2015; www.windowscentral.com/razer-firefly-review.*

* cited by examiner

*Primary Examiner* — Laurence J Lee
*Assistant Examiner* — Larry Lee
(74) *Attorney, Agent, or Firm* — Chun-Ming Shih; HDLS IPR Services

(57) ABSTRACT

A mouse pad structure includes a pad, a light source module, a control member, and a bendable wire. The light source module is installed in the pad. The control member is disposed corresponding to the pad. One end of the bendable wire is electrically connected to the light source module, the other end of the bendable wire is electrically connected to the control member, the bendable wire is provided for adjusting a distance between the control member and the pad. Accordingly, by collapsing or unfolding the bendable wire, the control member and the pad are spaced apart by a certain distance. Therefore, movement of a mouse cord is prevented from being obstructed by the control member, so a mouse can move smoothly, and smooth operations of the mouse are ensured.

9 Claims, 5 Drawing Sheets

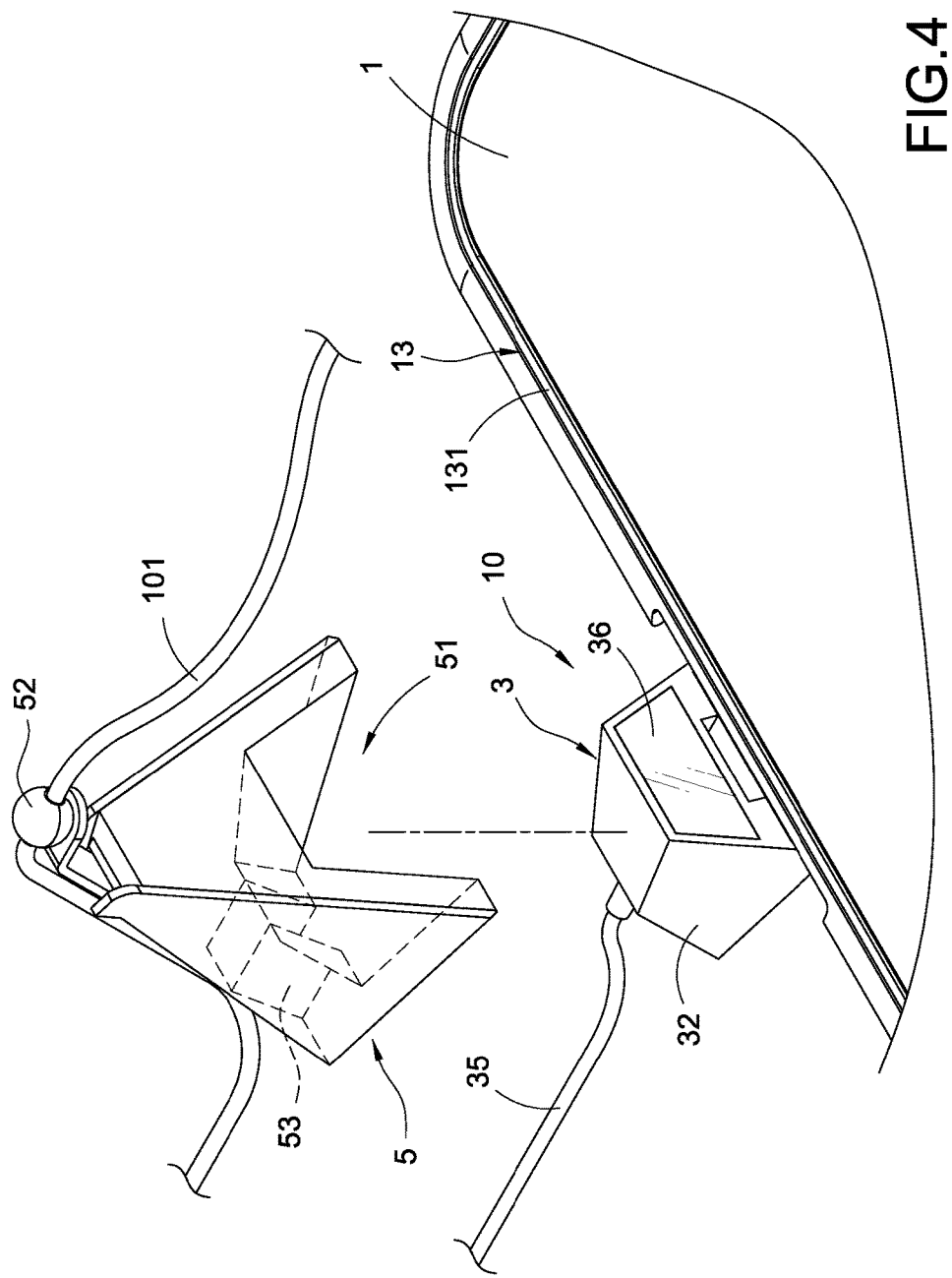

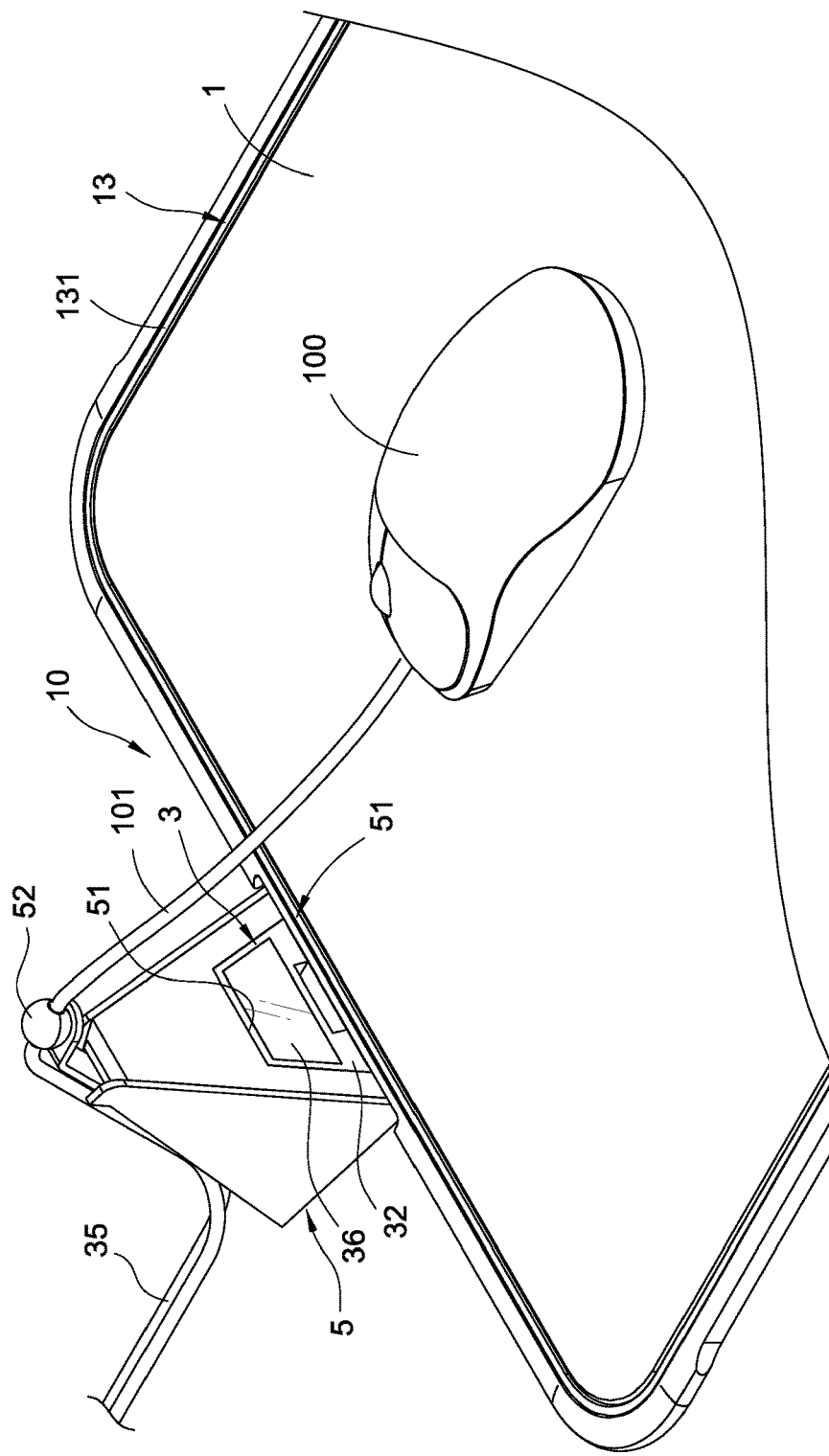

ILLUMINATED MOUSE PAD STRUCTURE WITH SEPARABLE CONTROL MODULE

TECHNICAL FIELD

The present invention relates to a computer peripheral and, in particular, to a mouse pad structure.

BACKGROUND

When operating a computer, a user holds a mouse to control a position of the computer's cursor and to input signals. In order to ensure smooth movement of the mouse, the mouse normally cooperates with a mouse pad, so the mouse can move on a smooth and flat surface of the mouse pad.

Moreover, due to fashion and stylish trends in modern society, the mouse pad may also include a light-emitting diode (LED) and a microcontroller unit (MCU). The light and its color of the LED can vary by means of the MCU.

However, the mouse pad having the control member may cause some disadvantages. The control member is typically directly fixed to the mouse pad and is arranged protruding on the mouse pad, so the control member tends to obstruct a mouse cord, the mouse is thereby dragged by the mouse cord, and operations of the mouse is not smooth.

Accordingly, the target of the inventor is to solve the above-mentioned problem, on the basis of which the present invention is accomplished.

SUMMARY

It is an object of the present invention to provide a mouse pad structure. A bendable wire of the mouse pad structure can be collapsed or unfolded, so that the control member and the pad are spaced from each other by a distance, thereby preventing a mouse cord from being obstructed by the control member. Accordingly, a mouse can move smoothly and smooth operations of the mouse can be ensured by using the mouse pad structure.

Accordingly, the present invention provides a mouse pad structure, comprising: a pad; a light source module installed in the pad; a control member disposed corresponding to the pad; and a bendable wire, one end of the bendable wire being electrically connected to the light source module, the other end of the bendable wire being electrically connected to the control member, the bendable wire being provided for adjusting a distance between the control member and the pad.

Accordingly, the mouse pad structure of the present invention further includes a mouse cord holder. The mouse cord holder engagedly receives the control member and is restricted by the control member. The mouse cord is lifted to a higher level by the mouse cord holder due to a height of the mouse cord holder, thereby the mouse is prevented from being dragged by the gravity of the mouse cord, and smooth operations of the mouser can be ensured.

BRIEF DESCRIPTION OF THE DRAWINGS

The disclosure will become more fully understood from the detailed description, and the drawings given herein below is for illustration only, and thus does not limit the disclosure, wherein:

FIG. 4 is a perspective exploded view illustrating the mouse pad structure according to another embodiment of the present invention; and FIG. 5 is a perspective assembled view illustrating the mouse pad structure according to the another embodiment of the present invention.

DETAILED DESCRIPTION

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Figure 1:
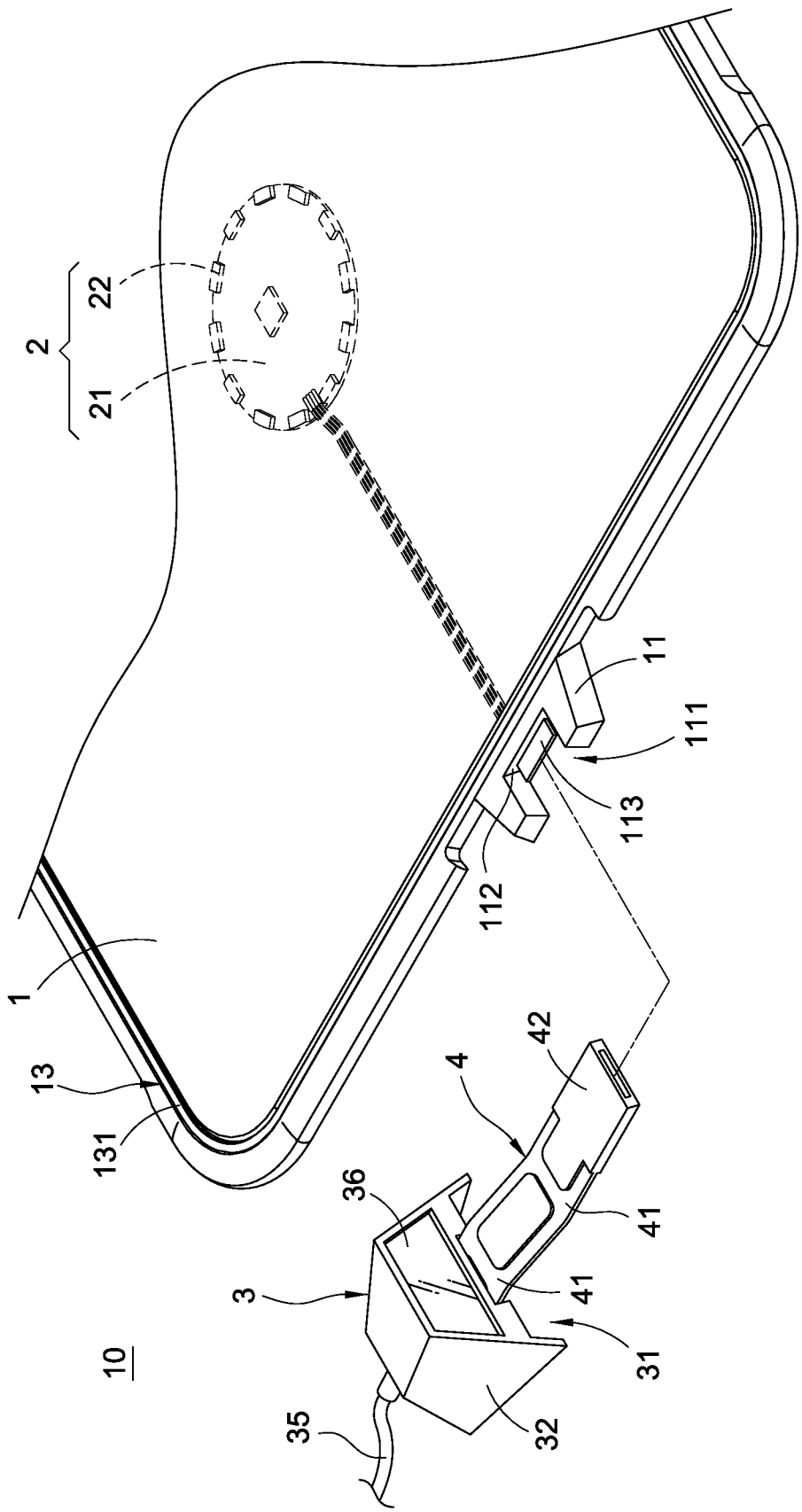
FIG. 1 is a perspective exploded view illustrating a mouse pad structure of the present invention.
Figure 2:
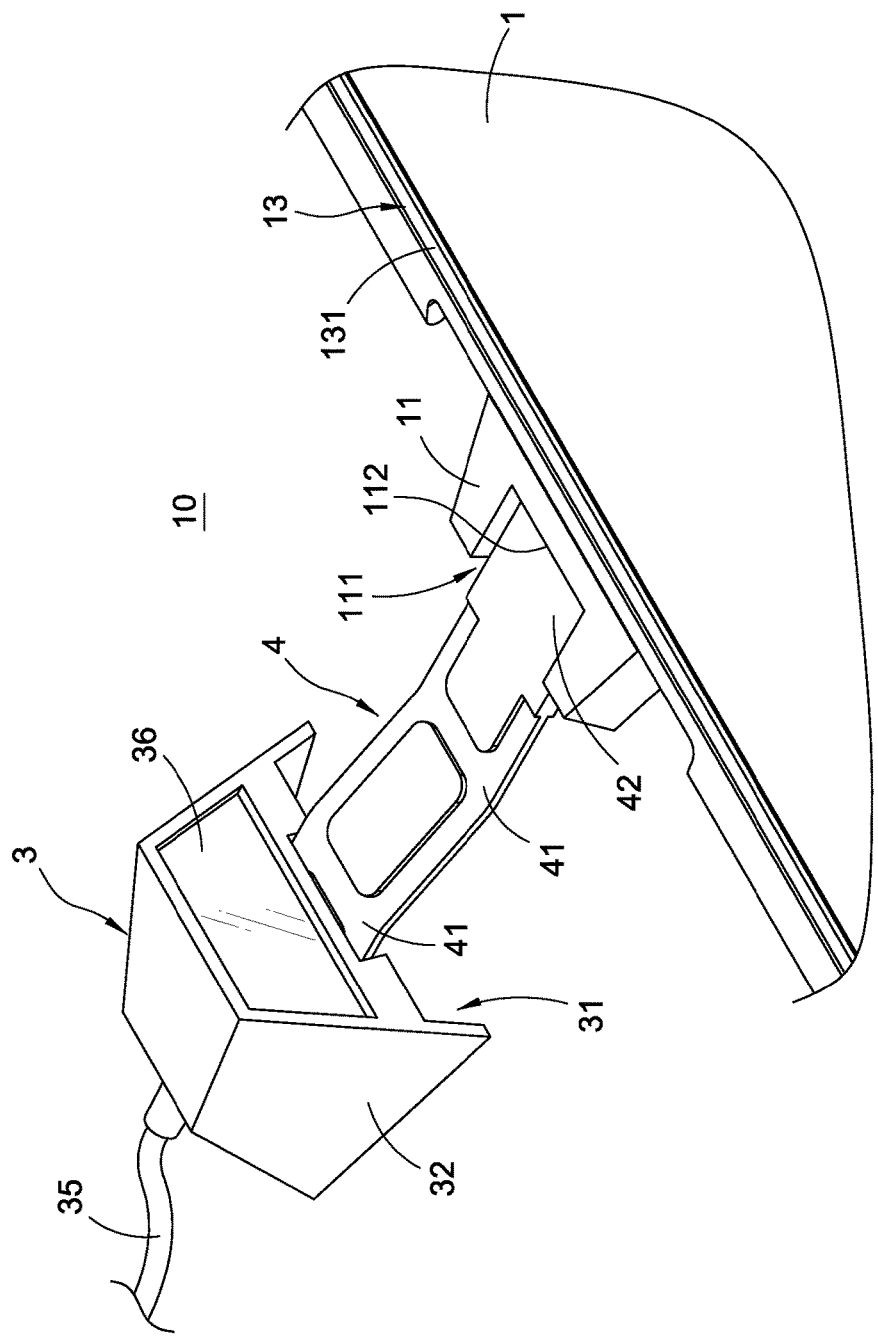
FIG. 2 is a perspective assembled view illustrating the mouse pad structure of the present invention.
Figure 3:
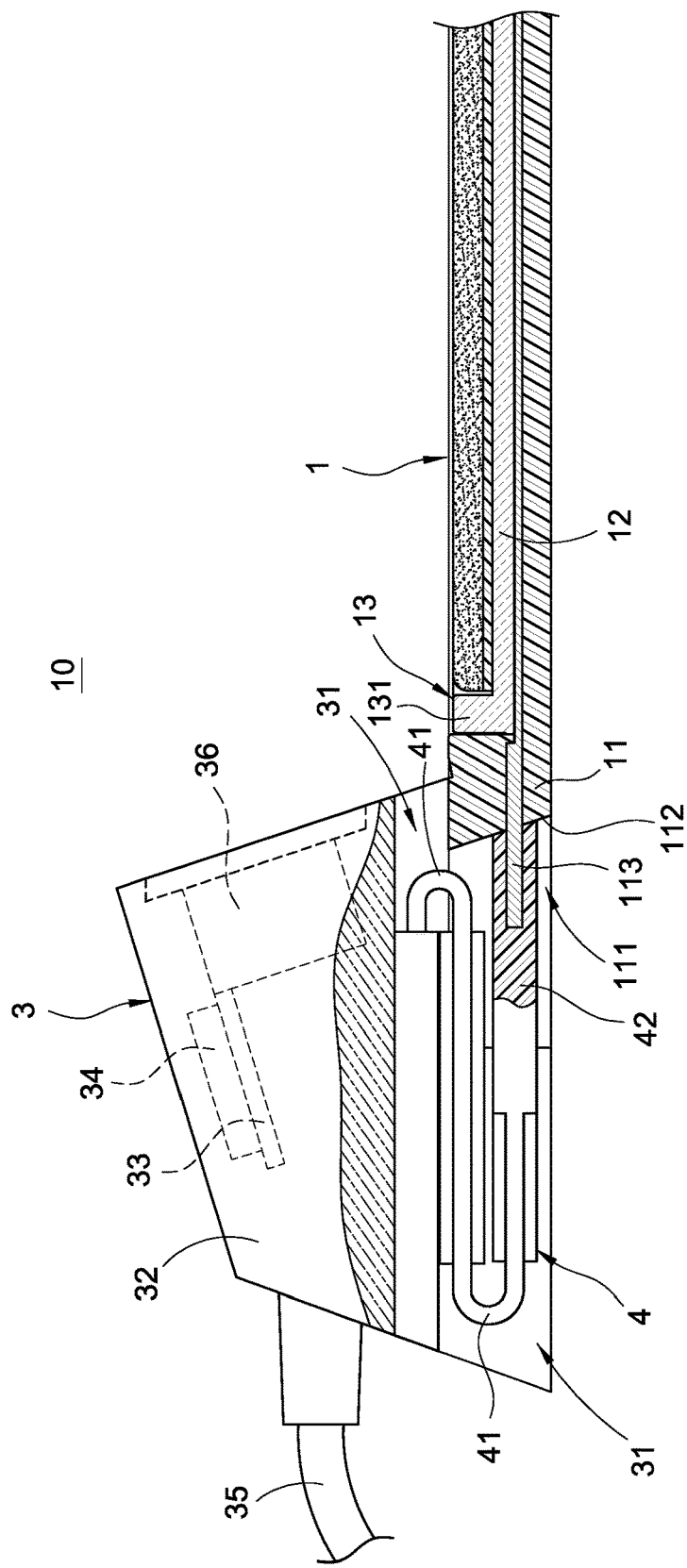
FIG. 3 is a cross-sectional view illustrating the mouse pad structure of the present invention.

Referring to FIGS. 1 to 3, the present invention provides a mouse pad structure; the mouse pad structure 10 includes a pad 1, a light source module 2, a control member 3 and a bendable wire 4.

A protruding block 11 extends from one side of the pad 1, the protruding block 11 includes an indentation 111 penetrating an upper surface and a lower surface at one side away from the pad 1, and a first connector 113 is installed on an inner surface 112 of the indentation 111.

Furthermore, a light guide plate 12 is disposed inside the pad 1, and the light guide plate 12 includes a light-transmitting portion 13 exposed from the pad 1. The light-transmitting portion 13 is a light-transmitting ring 131 disposed on an outer periphery of the pad 1.

The light source module 2 is installed in the pad 1 and is electrically connected to the first connector 113, the light source module 2 includes a first circuit board 21 and a plurality of light emitting diodes 22, the light emitting diodes 22 are installed on the first circuit board 21, the first circuit board 21 is embedded in the pad 1, and the light emitting diodes 22 are disposed corresponding to the light guide plate 12.

The control member 3 is disposed corresponding to the pad 1. A recess 31 indenting inwardly is formed at one side of a bottom of the control member 3. The control member 3 includes a base 32, a second circuit board 33 and a microcontroller unit (MCU) 34. The microcontroller unit 34 is installed on the second circuit board 33, the second circuit board and the microcontroller unit 34 are embedded in the base 32, the bendable wire 4 is electrically connected to the second circuit board 33, and the microcontroller unit 34 controls the light source module 2 to emit light which may be continuous, intermittent or blinking through the second circuit board 33.

Furthermore, the control member 3 further includes an external wire 35 and a display screen 36. The external wire 35 is electrically connected to the second circuit board 33. The external wire 35 is used to supply power to the control member 3 and transmit computer information (e.g. a mouse operation state) to the second circuit board 33, the display screen 36 is assembled to the base 32 and is electrically connected to the second circuit board 33, and the display screen 6 is used to display MCU information (i.e. information of the microcontroller unit 34) or computer information (e.g. the mouse operation state).

One end of the bendable wire 4 is fixed to the control member 3, the other end of the bendable wire 4 is provided with a second connector 42, and the second connector 42 is detachably connected to the first connector 113, so that one end of the bendable wire 4 is electrically connected to the light source module 2, and the other end of the bendable wire 4 is electrically connected to the control member 3. The bendable wire 4 is provided for adjusting a distance between the control member 3 and the pad 1.

To be specific, the recess 31 is disposed adjacent to the bendable wire 4; the bendable wire 4 has plurality of bent sections 41. When the control member 3 engagedly receives the protruding block 11 by means of the recess 31 and is restricted by the protruding block 11, the bendable wire 4 can be collapsed and received inside the recess 31 by means of the bent sections 41, so the bendable wire 4 can be collapsed between the recess 31 and the indentation 111.

In the mouse pad structure 10, the light source module 2 is installed in the pad 1, the control member 3 is disposed corresponding to the pad 1, one end of the bendable wire 4 is electrically connected to the light source module 2, the other end of the bendable wire 4 is electrically connected to the control member 3, and the bendable wire 4 is provided for adjusting a distance between the control member 3 and the pad 1.

Referring to FIG. 3 showing an in-use view of the mouse pad structure 10, when the control member 3 engagedly receives the protruding block 11 by means of the recess 31, the bendable wire 4 can be collapsed and received between the recess 31 and the indentation 111 by means of the bent sections 41, so the mouse pad structure 10 has an advantage of reducing occupied space.

Referring to FIG. 2 showing another in-use view of the mouse pad structure 10, when the control member 3 moves in a direction to be released from the protruding block 11, the collapsed bendable wire 4 is unfolded by pulling flat the bent sections 41, so that the control member 3 and the pad 1 are spaced from each other by a distance s, thereby preventing a mouse cord from being obstructed by the control member 3. Accordingly, a mouse can move smoothly and smooth operations of the mouse can be ensured by using the mouse pad structure 10.

Please refer to FIGS. 4 and 5, showing the mouse pad structure 10 according to another embodiment of the present invention. The embodiment of FIGS. 4 and 5 is similar to the embodiment of FIGS. 1 to 3. The difference lies in that the mouse pad structure 10 in the embodiment of FIGS. 4 and 5 further includes a mouse cord holder 5.

In detail, a recessed portion 51 is disposed at a bottom portion of the mouse cord holder 5, a cord clamping portion 52 is disposed at a top of the mouse cord holder 5, and the mouse cord holder 5 engagedly receives the control member 3 by means of the recessed portion 51 and is restricted by the control member 3. Thus, one section of the mouse cord 101 is clamped by the cord clamping portion 52, and the mouse cord 101 is partially lifted to a higher level by the mouse cord holder 5 due to a height of the mouse cord holder 5. As a result, the mouse 100 is not dragged by the gravity of the mouse cord 101, and the mouse can move smoothly, so smooth operations of the mouse 100 can be ensured by using the mouse cord holder 5.

Moreover, a through slot 53 is disposed at the bottom portion of the mouse cord holder 5 and communicates with the recessed portion 51, and the external wire 35 is received in and inserted through the through slot 53.

In summary, the mouse pad structure of the present invention can achieve anticipated objectives and solve the conventional defects. The present invention also has industrial applicability, novelty and non-obviousness, so the present invention completely complies with the requirements of patentability. Therefore, a request to patent the present invention is filed pursuant to patent law. Examination is kindly requested, and allowance of the present application is solicited to protect the rights of the inventor.

What is claimed is:

1. A mouse pad structure, comprising:
   a pad;
   a light source module installed in the pad;
   a control member disposed corresponding to the pad; and
   a bendable wire, one end of the bendable wire being electrically connected to the light source module, the other end of the bendable wire being electrically connected to the control member, the bendable wire being provided for adjusting a distance between the control member and the pad,
   wherein a recess is formed at one side of a bottom of the control member adjacent to the bendable wire, the bendable wire has a plurality of bent sections, and the bendable wire is collapsed and received inside the recess by means of the bent sections.

2. The mouse pad structure of claim 1, wherein a protruding block extends from one side of the pad, the protruding block includes an indentation penetrating an upper surface and a lower surface at one side away from the pad, the control member engagedly receives the protruding block by means of the recess and is restricted by the protruding block, and the bendable wire is collapsible between the recess and the indentation.

3. The mouse pad structure of claim 2, wherein a first connector is installed on an inner surface of the indentation, the light source module is electrically connected to the first connector, one end of the bendable wire is fixed to the control member, the other end of the bendable wire is provided with a second connector, and the second connector is detachably connected to the first connector.

4. The mouse pad structure of claim 1, wherein the control member includes a base, a second circuit board and a microcontroller unit, the recess is formed in the base, the microcontroller unit is installed on the second circuit board, the second circuit board and the microcontroller unit are embedded in the base, the bendable wire is electrically connected to the second circuit board, and the microcontroller unit controls the light source module through the second circuit board.

5. The mouse pad structure of claim 4, wherein the control member further includes a display screen, and the display screen is assembled to the base and is electrically connected to the second circuit board.

6. A mouse pad structure, comprising:
   a pad;
   a light source module installed in the pad;
   a control member disposed corresponding to the pad;
   a bendable wire, one end of the bendable wire being electrically connected to the light source module, the other end of the bendable wire being electrically connected to the control member, the bendable wire being provided for adjusting a distance between the control member and the pad; and
   a mouse cord holder, wherein a recessed portion is disposed at a bottom portion of the mouse cord holder, a cord clamping portion is disposed at a top of the mouse cord holder, and the mouse cord holder engagedly receives the control member by means of the recessed portion and is restricted by the control member.

7. The mouse pad structure of claim 6, wherein the control member includes an external wire, a through slot is disposed at the bottom portion of the mouse cord holder and communicates with the recessed portion, and the external wire is received in and inserted through the through slot.

8. The mouse pad structure of claim 6, wherein a light guide plate is disposed inside the pad, the light guide plate includes a light-transmitting portion exposed from the pad, the light source module includes a first circuit board and a plurality of light emitting diodes, the light emitting diodes are installed on the first circuit board, the first circuit board is embedded in the pad, and the light emitting diodes are disposed corresponding to the light guide plate.

9. The mouse pad structure of claim 8, wherein the light-transmitting portion is a light-transmitting ring disposed on an outer periphery of the pad.

\* \* \* \* \*